US012315308B2

(12) United States Patent
Takegoshi et al.

(10) Patent No.: US 12,315,308 B2
(45) Date of Patent: May 27, 2025

(54) SERVER APPARATUS, VEHICLE, AND METHOD FOR MANAGING A PLURALITY OF VEHICLES EXECUTING WORK IN A PREDETERMINED AREA

(71) Applicant: HONDA MOTOR CO., LTD., Tokyo (JP)

(72) Inventors: Katsuya Takegoshi, Tokyo (JP); Satoshi Nishimiya, Tokyo (JP); Hiroki Muta, Tokyo (JP); Teruki Hatano, Tokyo (JP); Yoshimi Watanabe, Tokyo (JP); Hibiki Koga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 669 days.

(21) Appl. No.: 17/162,089

(22) Filed: Jan. 29, 2021

(65) Prior Publication Data

US 2021/0256779 A1    Aug. 19, 2021

Related U.S. Application Data

(63) Continuation of application No. PCT/JP2018/029537, filed on Aug. 7, 2018.

(51) Int. Cl.
*G07C 5/00* (2006.01)
*G01M 17/007* (2006.01)
(Continued)

(52) U.S. Cl.
CPC ........... *G07C 5/008* (2013.01); *G07C 5/0816* (2013.01); *G01M 17/007* (2013.01); *H04L 67/12* (2013.01)

(58) Field of Classification Search
CPC ... G07C 5/008; G07C 5/0816; G01M 17/007; H04L 67/12; G08B 25/00; G08B 27/00; G08G 1/205
See application file for complete search history.

(56) References Cited

U.S. PATENT DOCUMENTS 10,112,529 B2    10/2018  Gurunathan
10,223,899 B2     3/2019  Yukizane et al.
(Continued)

FOREIGN PATENT DOCUMENTS

CN    103116917 A  *  5/2013
CN    105262792 A  *  1/2016  ............. H04L 67/12
(Continued)

OTHER PUBLICATIONS

Machine Translation of KR-20160009906-A (Year: 2016).*
(Continued)

*Primary Examiner* — Sahar Motazedi
(74) *Attorney, Agent, or Firm* — THOMAS | HORSTEMEYER, LLP

(57) ABSTRACT

The present invention provides a server apparatus communicably connected to a vehicle and a plurality of information terminals, comprising: a reception unit configured to receive abnormality detection information from the vehicle; a selection unit configured to select, if the reception unit receives the abnormality detection information, among the plurality of information terminals, the information terminal existing within a predetermined range from the vehicle as a target terminal to which the abnormality notification information of the vehicle is to be transmitted; and a transmission unit configured to transmit the abnormality notification information to the information terminal selected by the selection unit.

11 Claims, 10 Drawing Sheets

(51) Int. Cl.
    *G07C 5/08* (2006.01)
    *H04L 67/12* (2022.01)

(56) References Cited

U.S. PATENT DOCUMENTS

| | | |
|---|---|---|
| 2015/0281810 A1 | 10/2015 | Babaguchi |
| 2016/0071399 A1 | 3/2016 | Altman et al. |
| 2017/0101054 A1* | 4/2017 | Dusane ............ G08G 1/096741 |
| 2017/0136943 A1 | 5/2017 | Gurunathan |
| 2018/0197409 A1* | 7/2018 | Youm ................... G08B 25/08 |
| 2018/0276980 A1 | 9/2018 | Yukizane et al. |

FOREIGN PATENT DOCUMENTS

| | | | | |
|---|---|---|---|---|
| EP | 2107531 A1 | 10/2009 | | |
| JP | H11175885 A | 7/1999 | | |
| JP | 2000092240 A | 3/2000 | | |
| JP | 2006104933 A * | 4/2006 | ............ | G08C 17/02 |
| JP | 2012081160 A | 4/2012 | | |
| JP | 2015201188 A | 11/2015 | | |
| JP | 2015216565 A | 12/2015 | | |
| JP | 2017068612 A | 4/2017 | | |
| JP | 2018116839 A | 7/2018 | | |
| KR | 20160009906 A * | 1/2016 | ............ | G08B 21/00 |
| WO | 2009072165 A1 | 6/2009 | | |
| WO | 2018/046106 A1 | 3/2018 | | |
| WO | WO-2018232866 A1 * | 12/2018 | ............ | G06Q 50/26 |
| WO | 2020031249 A1 | 2/2020 | | |

OTHER PUBLICATIONS

Machine Translation of WO-2018232866-A1 (Year: 2018).*
Machine Translation of CN-103116917-A (Year: 2013).*
Machine Translation of CN-105262792-A (Year: 2016).*
Machine Translation of JP2006104933A (Year: 2006).*
Extended European Search Report for European Patent Application 18929256.8 mailed Jun. 28, 2021.
International Search Report and Written Opinion for PCT/JP2018/029537 mailed Oct. 2, 2018.

* cited by examiner

F I G. 11
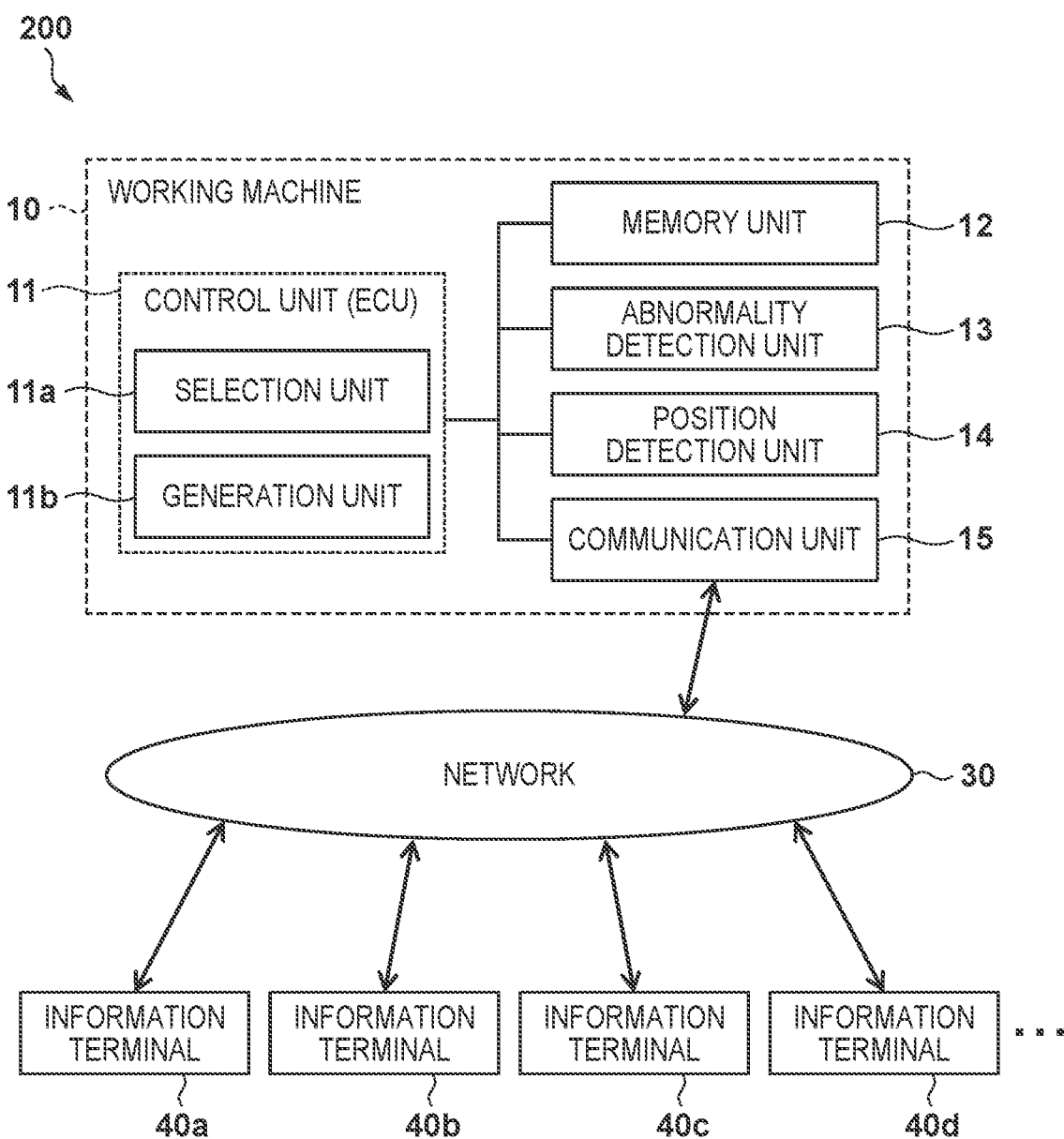

SERVER APPARATUS, VEHICLE, AND METHOD FOR MANAGING A PLURALITY OF VEHICLES EXECUTING WORK IN A PREDETERMINED AREA

CROSS-REFERENCE TO RELATED APPLICATION

This application is a continuation of International Patent Application No. PCT/JP2018/029537 filed on Aug. 7, 2018, the entire disclosures of which are incorporated herein by reference.

BACKGROUND OF THE INVENTION

Field of the Invention

The present invention relates to a technique of making a notification of an abnormality of a vehicle.

Description of the Related Art

Japanese Patent Laid-Open No. 11-175885 discloses a system in which a sensor (GPS sensor or inertial sensor) for detecting an abnormality of a vehicle is provided and, when the sensor detects an abnormality of the vehicle, information about it is transmitted to a control center.

When a plurality of transmission destinations are preset, if information indicating that an abnormality of a vehicle has been detected is transmitted to the plurality of transmission destinations, people go to deal with the abnormality of the vehicle from the plurality of transmission destinations, which is very inefficient.

The present invention efficiently deals with an abnormality of a vehicle.

SUMMARY OF THE INVENTION

According to the present invention, there is provided a server apparatus communicably connected to a vehicle and a plurality of information terminals, comprising: a reception unit configured to receive abnormality detection information from the vehicle; a selection unit configured to select, if the reception unit receives the abnormality detection information, among the plurality of information terminals, the information terminal existing within a predetermined range from the vehicle as a target terminal to which the abnormality notification information of the vehicle is to be transmitted; and a transmission unit configured to transmit the abnormality notification information to the information terminal selected by the selection unit.

Further features of the present invention will become apparent from the following description of exemplary embodiments (with reference to the attached drawings).

BRIEF DESCRIPTION OF THE DRAWINGS

FIG. 11 is a block diagram showing the arrangement of a system according to the second embodiment.

DESCRIPTION OF THE EMBODIMENTS

Figure 1:
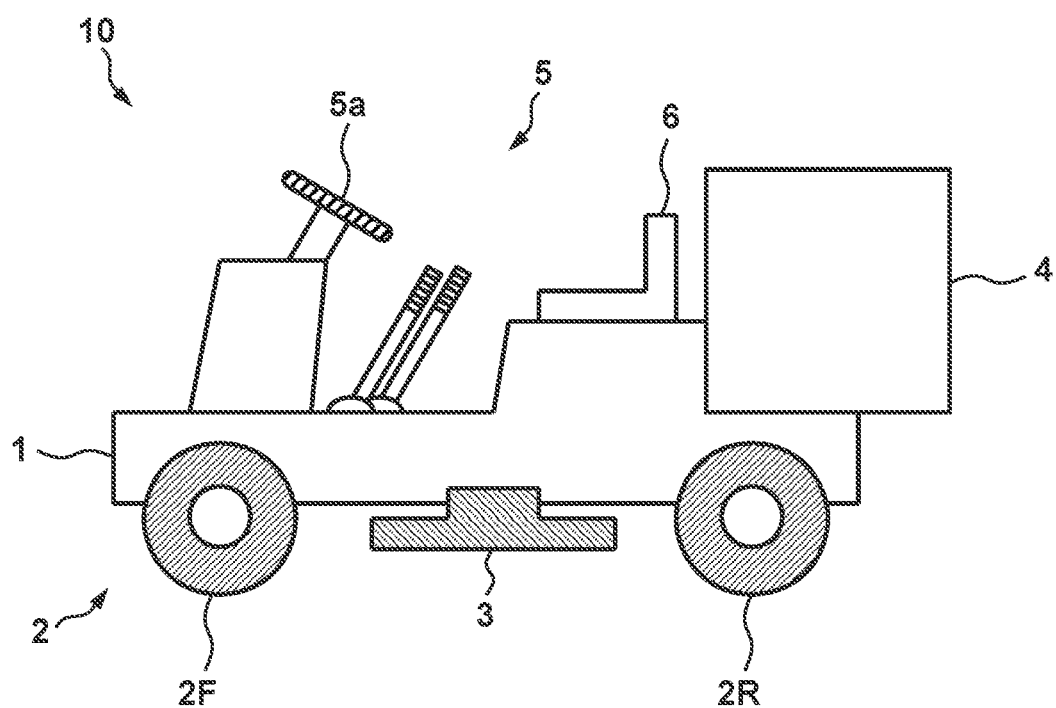
FIG. 1 is a view showing an example of the arrangement of a vehicle (working machine)

Embodiments of the present invention will be described below with reference to the accompanying drawings. Note that the drawings are schematic views showing a structure or an arrangement according to the embodiment, and the dimensions of members shown in the drawings do not necessarily reflect real dimensions. The same reference numerals denote the same elements in the drawing, and a description of repetitive contents will be omitted in this specification.

First Embodiment

The first embodiment of the present invention will be described. FIG. 1 is a view showing an example of the arrangement of a vehicle 10 according to this embodiment. The vehicle 10 may be any of a two-wheeled vehicle, a three-wheeled vehicle, or a four-wheeled vehicle. However, this embodiment will exemplify, as the vehicle 10, a working machine (to also be referred to as the working machine 10 hereinafter) configured to execute a work in a predetermined area. Examples of the working machine 10 are a lawn mower, a blower, a cultivator, and a snowplow. In this embodiment, however, the working machine 10 is a lawn mower. In this embodiment, the working machine 10 is a riding vehicle whose vehicle body 1 is provided with a seat 6 on which an operator (occupant) can sit. However, the working machine 10 is not limited to this example, and may be, for example, an unmanned traveling vehicle or a handcart of a type that is pushed with the hands of the operator. The working machine 10 includes a traveling unit 2, a working unit 3, a storage unit 4, and an operation unit 5.

The traveling unit 2 is configured to make the working machine 10 travel and provided on the lower side of the vehicle body 1 to support the vehicle body 1. In this embodiment, the working machine 10 is a four-wheeled vehicle, and the traveling unit 2 includes a pair of left and right rear wheels 2R as driving wheels and a pair of left and right front wheels 2F as driven wheels.

In this embodiment, the working unit 3 is a lawn mowing blade provided on the lower side of the vehicle body 1, and is provided such that the position in the vertical direction of the vehicle body with respect to the working unit 3 can be adjusted. Hence, the lawn mowing blade serving as the working unit 3 can mow a lawn in a working area to a desired height.

The storage unit 4 stores the lawn mowed by the lawn mowing blade serving as the working unit 3. For example, the vehicle body 1 is provided with a duct (not shown) from the upper portion of the working unit 3 to the rear portion, and the mowed lawn is guided to the storage unit 4 via the duct and stored.

The operation unit 5 includes a plurality of operators configured to drive and control the traveling unit 2 and the working unit 3. As one example of the operation unit 5, a steering wheel 5a serving as a steering operator is shown here. In addition, an acceleration operator, a braking operator, a working operator, and the like are included. Note that as these operators, any one of a pedal method, a lever method, a switch method, and the like may be employed.

Figure 2:
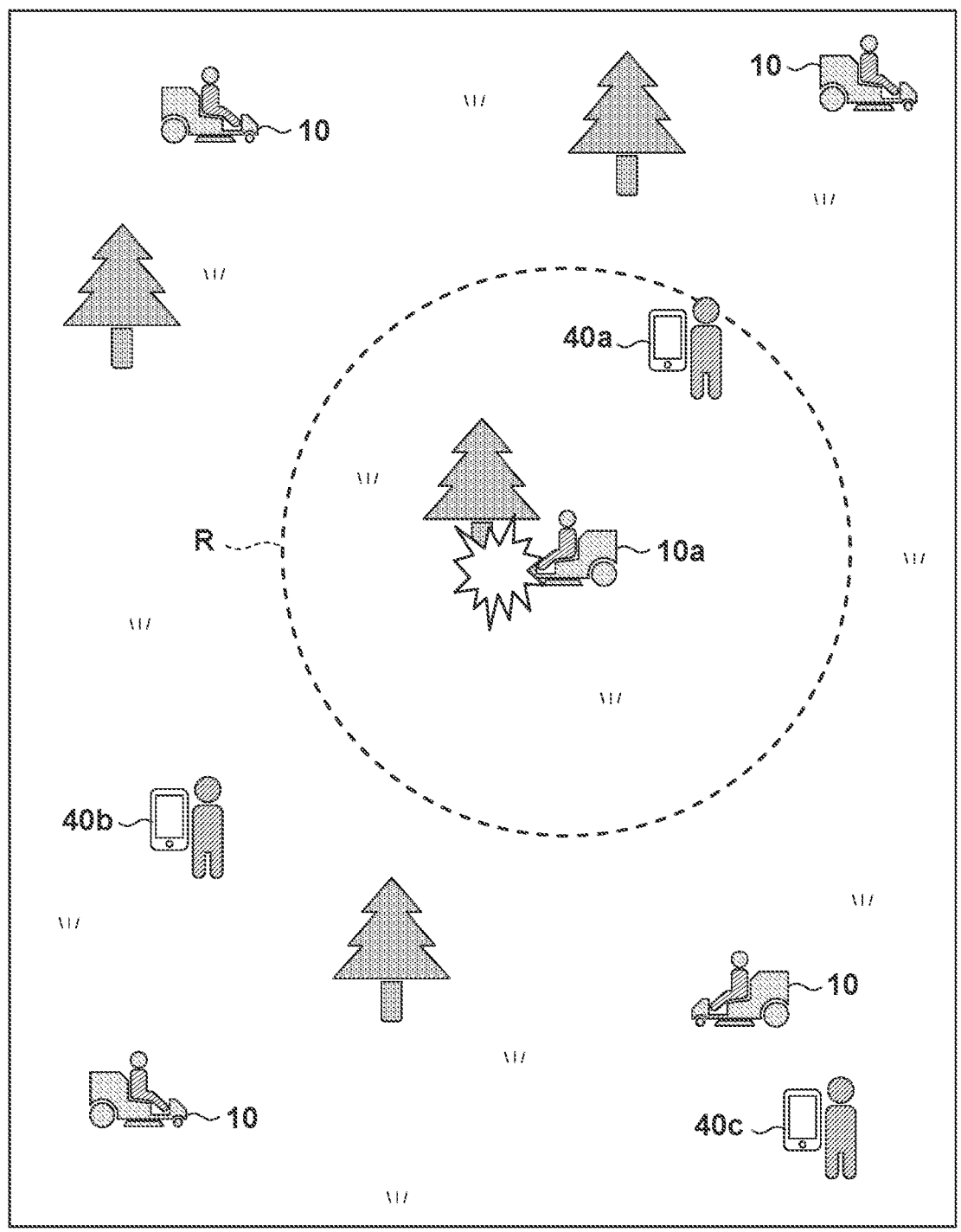
FIG. 2 is a view showing a state in which a plurality of working machines are working in a working area.

FIG. 2 is a view showing a state in which the plurality of working machines 10 are working in a working area. In the example shown in FIG. 2, the working machines 10 are performing lawn mowing operations at a plurality of positions in the working area, and leaders each holding an information terminal 40 are arranged in the working area. FIG. 2 shows an example in which three leaders are arranged. The information terminals 40 held by three leaders are represented by information terminals 40a to 40c. Each of the information terminals 40a to 40c can be, for example, a portable information terminal such as a portable phone including a display (display unit) capable of displaying received information.

In the working area where the plurality of working machines 10 are working, for example, an abnormality of the working machine 10 may occur, such as a crash against a tree existing within the working area or run-off of a wheel into a ditch existing in the working area. FIG. 2 shows an example in which the working machine 10a crashes against a tree to cause an abnormality. When an abnormality occurs in the working machine 10a, if pieces of information of the same contents indicating the abnormality (the problem) of the working machine 10a are respectively transmitted to the plurality of information terminals 40a to 40c, the plurality of leaders go to deal with the abnormality of the working machine 10a, which is very inefficient. The abnormality of the working machine 10 includes dangerous traveling such as sudden acceleration or high-speed traveling by the worker. If such abnormality (dangerous traveling) of the working machine 10 occurs, it is preferable to transmit the information to the leader existing around the worker who has performed dangerous traveling, instead of transmitting the information to all the plurality of leaders (information terminals). To do this, in this embodiment, among the plurality of preregistered information terminals 40, the information terminal 40a existing within a predetermined range R from the working machine 10a in which the abnormality has occurred is selected, and the information is transmitted to the selected information terminal 40a.

Figure 3:
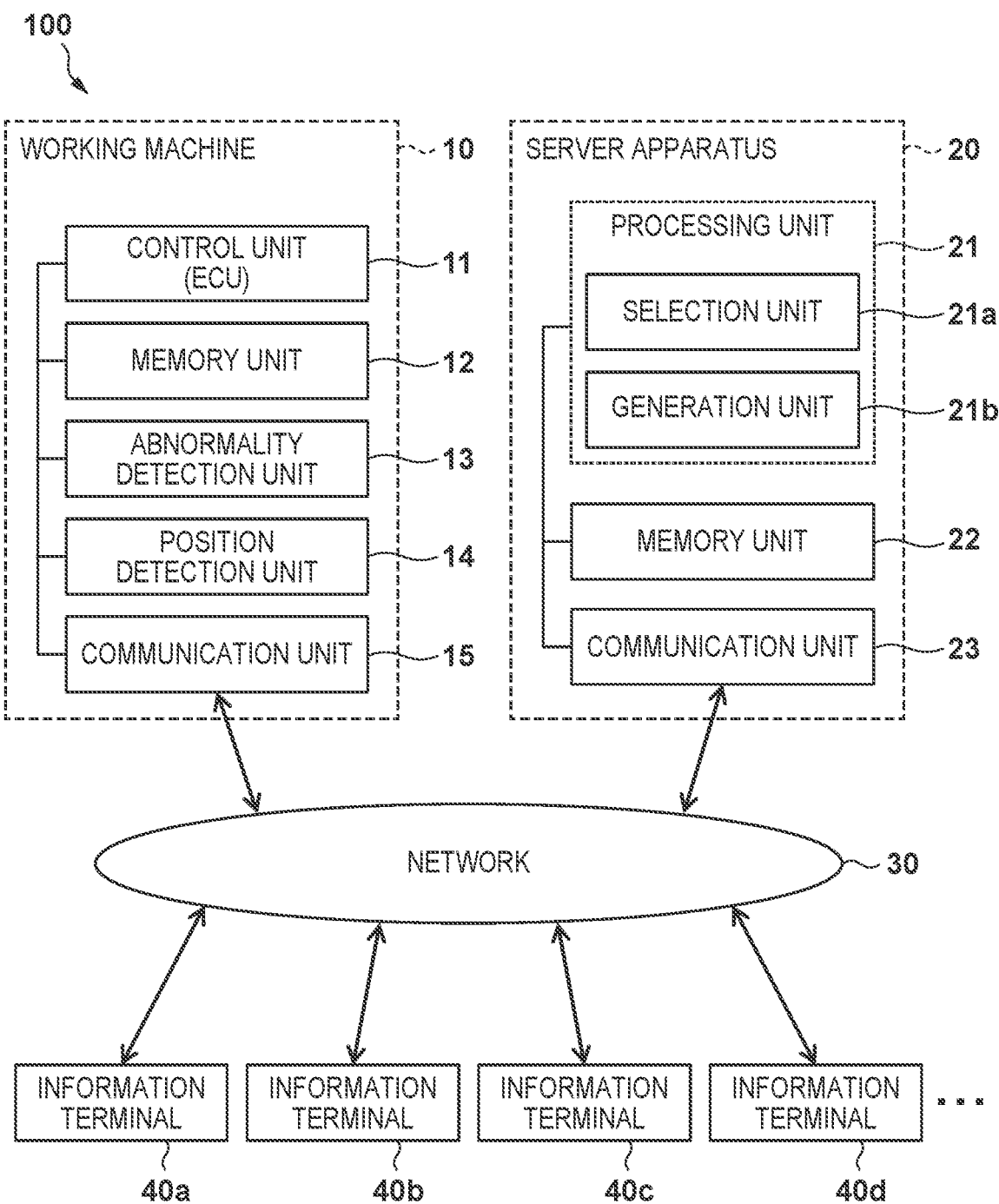
FIG. 3 is a block diagram showing the arrangement of a system according to the first embodiment.

FIG. 3 is a block diagram showing the arrangement of a system 100 according to this embodiment. The system 100 according to this embodiment includes the working machine 10, a server apparatus 20 (cloud), and the plurality of information terminals 40 (information terminals 40a to 40d in FIG. 3).

The working machine 10 can include, as in-vehicle devices, a control unit 11, a memory unit 12, an abnormality detection unit 13, a position detection unit 14, and a communication unit 15 (a transmission unit). The control unit 11 is an ECU (Electronic Control Unit) in this embodiment, and includes a processor represented by a CPU, a memory device such as a semiconductor memory, and an interface with an external device. The memory unit 12 stores a program to be executed by the processor, data to be used by the processor for processing, and the like, and the control unit 11 (ECU) can read out the program stored in the memory unit 12 into the memory device such as a memory and execute it.

The abnormality detection unit 13 detects an abnormality of the working machine 10. More specifically, the abnormality detection unit 13 includes a vibration sensor that detects a vibration of the vehicle body 1, and an acceleration sensor that detects the acceleration of the vehicle body 1, and detects occurrence of an abnormality when a value (vibration or acceleration) detected by each sensor exceeds a predetermined value. The abnormality detection unit 13 may be configured to detect an abnormality caused by an internal element of the working machine 10, such as an abnormality of the engine of the working machine 10 and an abnormality of a lawn mowing blade (working unit 3), in addition to an abnormality caused by run-off of a wheel or crash of the working machine 10. More specifically, the abnormality detection unit 13 can be provided with a sensor that detects the rotation speed of the engine or lawn mowing blade, and detect occurrence of an abnormality when the rotation speed detected by the sensor does not reach a desired value.

The position detection unit 14 detects the current position of the working machine 10. More specifically, the position detection unit 14 includes a GPS sensor that detects the position of the working machine 10 and a gyro sensor that detects the rotary motion of the working machine 10, and detects the current position of the working machine 10 based on the detection result of each sensor.

The communication unit 15 is communicably connected to the server apparatus 20 via a network 30. More specifically, the communication unit 15 has a function as a reception unit that receives information from the server apparatus 20 via the network 30 and a function as a transmission unit that transmits information to the server apparatus 20 via the network 30. In this embodiment, if the abnormality detection unit 13 detects an abnormality of the working machine 10, the communication unit 15 transmits abnormality detection information to the server apparatus 20 via the network 30. The abnormality detection information may include, for example, information indicating the value (vibration, acceleration, rotation speed, or the like) detected by the abnormality detection unit 13 and the position information of the working machine 10 detected by the position detection unit 14 in addition to information about detection of the abnormality by the abnormality detection unit 13. This embodiment assumes that the abnormality detection information includes both the value detected by the abnormality detection unit 13 and the position information detected by the position detection unit 14.

The server apparatus 20 can include, for example, a processing unit 21, a memory unit 22, and a communication unit 23 (a transmission unit). The processing unit 21 includes a processor represented by a CPU, a memory device such as a semiconductor memory, and an interface with an external device. The memory unit 22 stores a program to be executed by the processor, data to be used by the processor for processing, and the like, and the processing unit 21 can read out the program stored in the memory unit 22 into the memory device such as a memory and execute it. The processing unit 21 includes a selection unit 21a that selects, among the plurality of information terminals 40, the information terminal 40 (target terminal) to which abnormality notification information is to be transmitted, and a generation unit 21b that generates the abnormality notification information.

The communication unit 23 is communicably connected to each working machine 10 and each information terminal 40 via the network 30. More specifically, the communication unit 23 has a function as a reception unit that receives abnormality detection information from each working machine 10 via the network 30 and a function as a transmission unit that transmits abnormality notification information to each information terminal 40 via the network 30.

Figure 4:
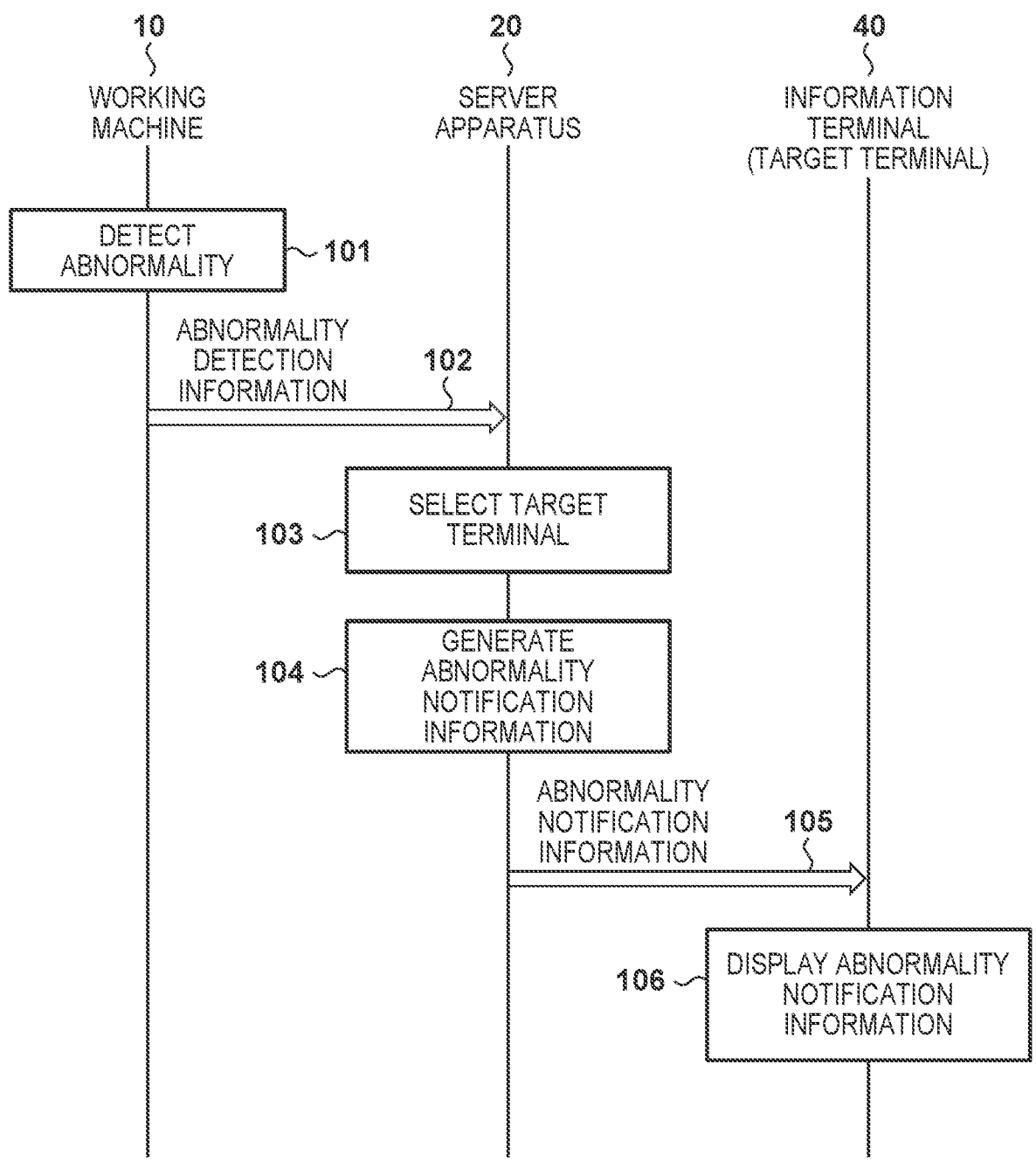
FIG. 4 is a sequence chart showing processing performed among a working machine, a server apparatus, and an information terminal (target terminal)

FIG. 4 is a sequence chart showing processing performed among the working machine 10, the server apparatus 20, and the information terminal 40 (target terminal). If an abnormality is detected in the working machine 10 (step 101), abnormality detection information is transmitted to the server apparatus 20 via the network 30 (step 102). Upon receiving the abnormality detection information, the server apparatus 20 selects (step 103), based on the pieces of position information of the information terminals 40 and the working machine 10, among the plurality of information terminals 40, a target terminal to which a notification of abnormality notification information is to be made, and generates abnormality notification information (step 104). Then, the abnormality notification information is transmitted to the target terminal (step 105). The target terminal (information terminal 40) displays the received abnormality notification information on the display (step 106). In the example shown in FIG. 4, step 104 is performed after step 103. However, step 104 may be performed before step 103 or steps 103 and 104 may be performed in parallel to each other.

Figure 5:
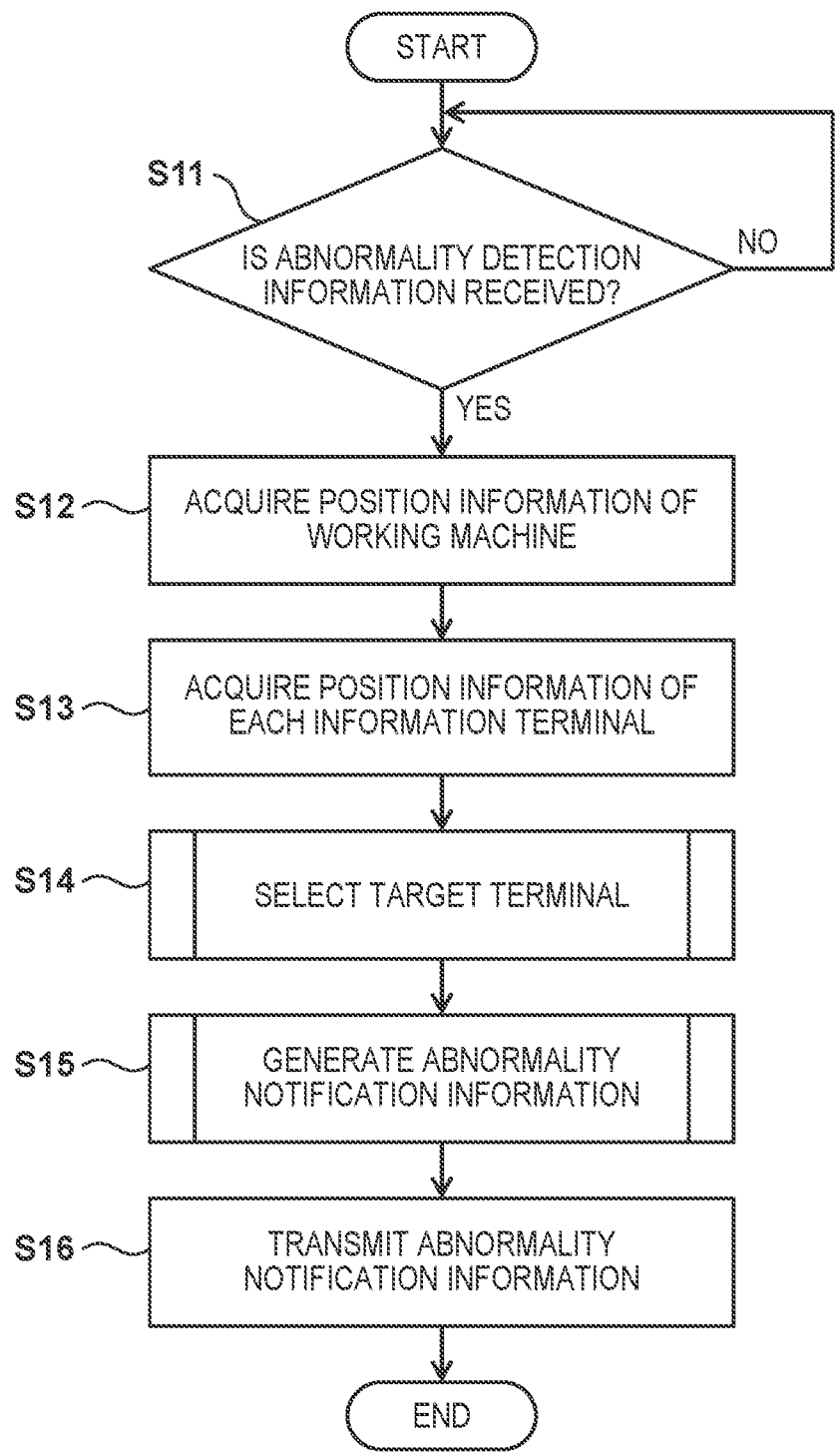
FIG. 5 is a flowchart illustrating a processing procedure by the server apparatus.

Processing performed by the server apparatus 20 will be described next. FIG. 5 is a flowchart illustrating a processing procedure by the server apparatus 20. Each step of the flowchart shown in FIG. 5 can be performed by the processing unit 21 of the server apparatus 20.

In step S11, the processing unit 21 determines whether abnormality detection information is received. For example, if, as shown in FIG. 2, the working machine 10a crashes against a tree, the acceleration of the working machine 10a detected by the acceleration sensor (or the vibration of the working machine 10a detected by the vibration sensor) is equal to or more than a predetermined value, and the abnormality detection unit 13 detects an abnormality. In this case, the working machine 10a transmits abnormality detection information indicating that the abnormality detection unit 13 has detected the abnormality, and the server apparatus 20 receives the abnormality detection information via the network. In this way, if the server apparatus 20 receives the abnormality detection information, the process advances to step S12.

In step S12, the processing unit 21 acquires the position information of the working machine 10 in which the abnormality has been detected. For example, if the received abnormality detection information includes the position information of the working machine 10, the processing unit 21 acquires the position information of the working machine 10 from the abnormality detection information. On the other hand, if the received abnormality detection information does not include the position information of the working machine 10a, the processing unit 21 acquires the position information detected by the position detection unit 14 of the working machine 10 by receiving it by the communication unit 23 via the network 30.

In step S13, the processing unit 21 acquires the position information of each information terminal 40. Each information terminal 40 is preset (preregistered) as a transmission destination of information for managing the plurality of working machines 10, and includes a GPS sensor or the like for detecting the current position. The processing unit 21 acquires the current position detected by the GPS sensor or the like in each information terminal 40 by receiving it by the communication unit 23 from each information terminal 40 via the network 30.

Figure 6:
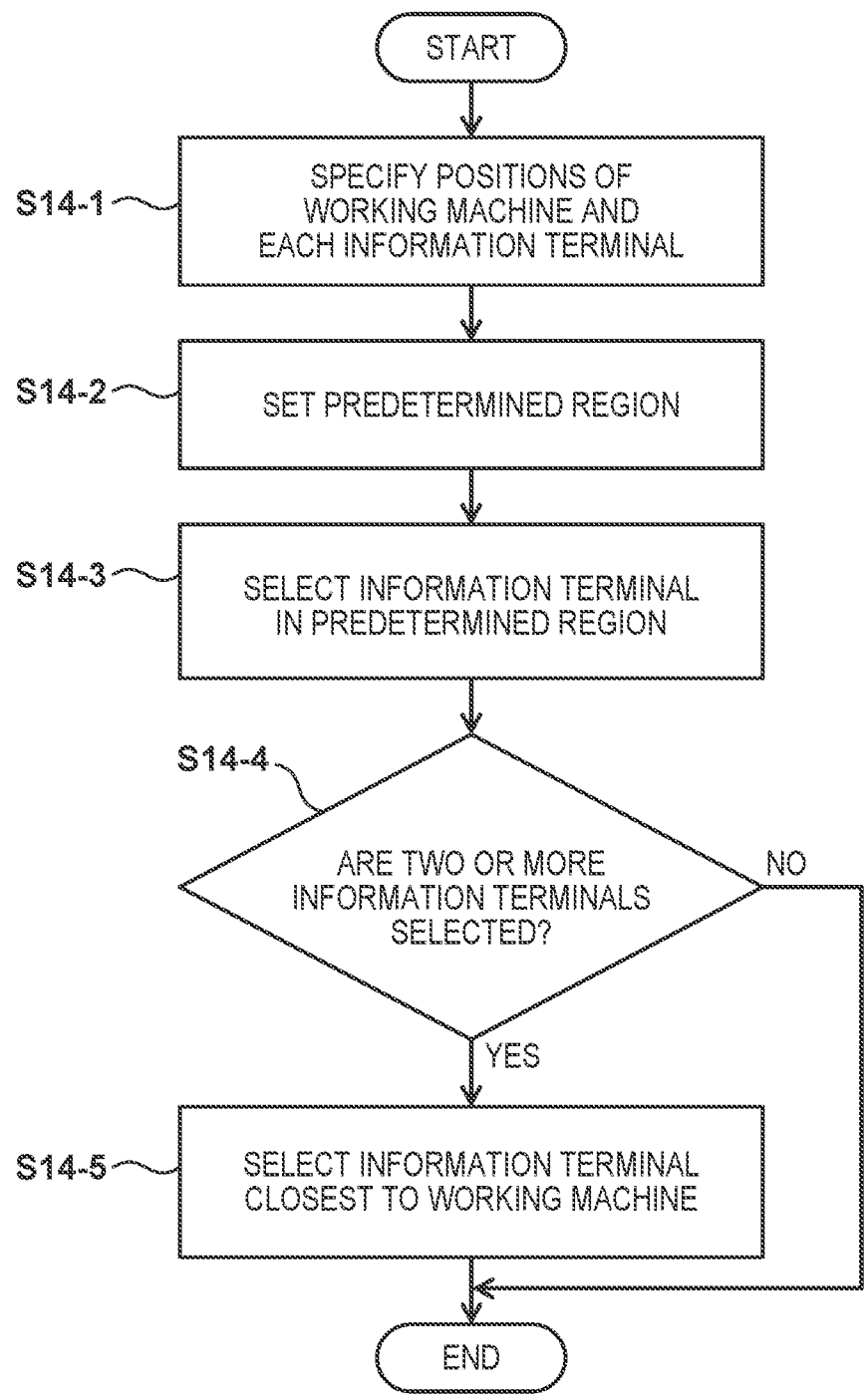
FIG. 6 is a flowchart illustrating an example of target terminal selection processing.

In step S14, the processing unit 21 (selection unit 21a) selects, among the plurality of information terminals 40, the target terminal to which abnormality notification information to be generated in step S15 (to be described later) is to be transmitted. A practical example of the target terminal selection processing performed in step S14 will be described with reference to FIG. 6. FIG. 6 is a flowchart illustrating an example of the target terminal selection processing. Each step of the flowchart shown in FIG. 6 can be performed by the selection unit 21a of the processing unit 21 of the server apparatus 20.

In step S14-1, based on the position information of the working machine 10 acquired in step S12 and the pieces of position information of the information terminals 40 acquired in step S13, the selection unit 21a specifies the positions of the respective information terminals 40 and the working machine 10 in which the abnormality has occurred. In step S14-2, the selection unit 21a sets the predetermined range R with respect to the working machine 10 in which the abnormality has occurred. For example, as shown in FIG. 2, the selection unit 21a sets, as the predetermined range R, a range within a predetermined distance with reference to (centering) the working machine 10a in which the abnormality has occurred. In step S14-3, the processing unit 21a selects the information terminals 40 existing within the predetermined region set in step S14-2. In the example shown in FIG. 2, since the information terminal 40a exists within the predetermined range R, the information terminal 40a is selected.

The predetermined distance can arbitrarily be set. However, for example, the interval of the plurality of leaders to be arranged in the working area may be set as the predetermined distance or if the working area is divided into a plurality of partial areas, the dimension (size) of one partial area may be set as the predetermined distance. The predetermined distance can be preset via, for example, a user interface but may automatically be set by the selection unit 21a based on the pieces of position information of the respective information terminals 40 specified in step S14-1. More specifically, the selection unit 21a may calculate the average, minimum, or maximum value of the intervals between the information terminals 40 based on the pieces of position information of the respective information terminals 40 specified in step S14-1, and set the calculated value as the predetermined distance.

In step S14-4, the selection unit 21a determines whether two or more information terminals 40 have been selected in step S14-3, that is, whether two or more information terminals 40 exist within the predetermined region R. If one information terminal 40 has been selected in step S14-3, this information terminal 40 is decided as the target terminal to which the abnormality notification information is to be transmitted. On the other hand, if two or more information terminals 40 have been selected, the process advances to step S14-5.

In step S14-5, the selection unit 21a selects, from the two or more information terminals 40 selected in step S14-3, the information terminal 40 closest to the working machine 10 in which the abnormality has been detected, and decides this information terminal 40 as the target terminal to which the abnormality notification information is to be transmitted. This embodiment has explained the example in which among the two or more information terminals 40 existing within the predetermined region, the information terminal 40 closest to the working machine 10 is selected as the target terminal. The present invention, however, is not limited to this. For example, if priority levels are preset for the plurality of information terminals 40, among the two or more information terminals 40 existing within the predetermined region, the information terminal 40 having the higher priority level may be selected as the target terminal. This embodiment has explained the example in which the predetermined region R is set. However, for example, an arrangement of selecting the information terminal 40 closest to the working machine 10 in which the abnormality has been detected, without setting the predetermined region R, may be adopted.

Figure 7:
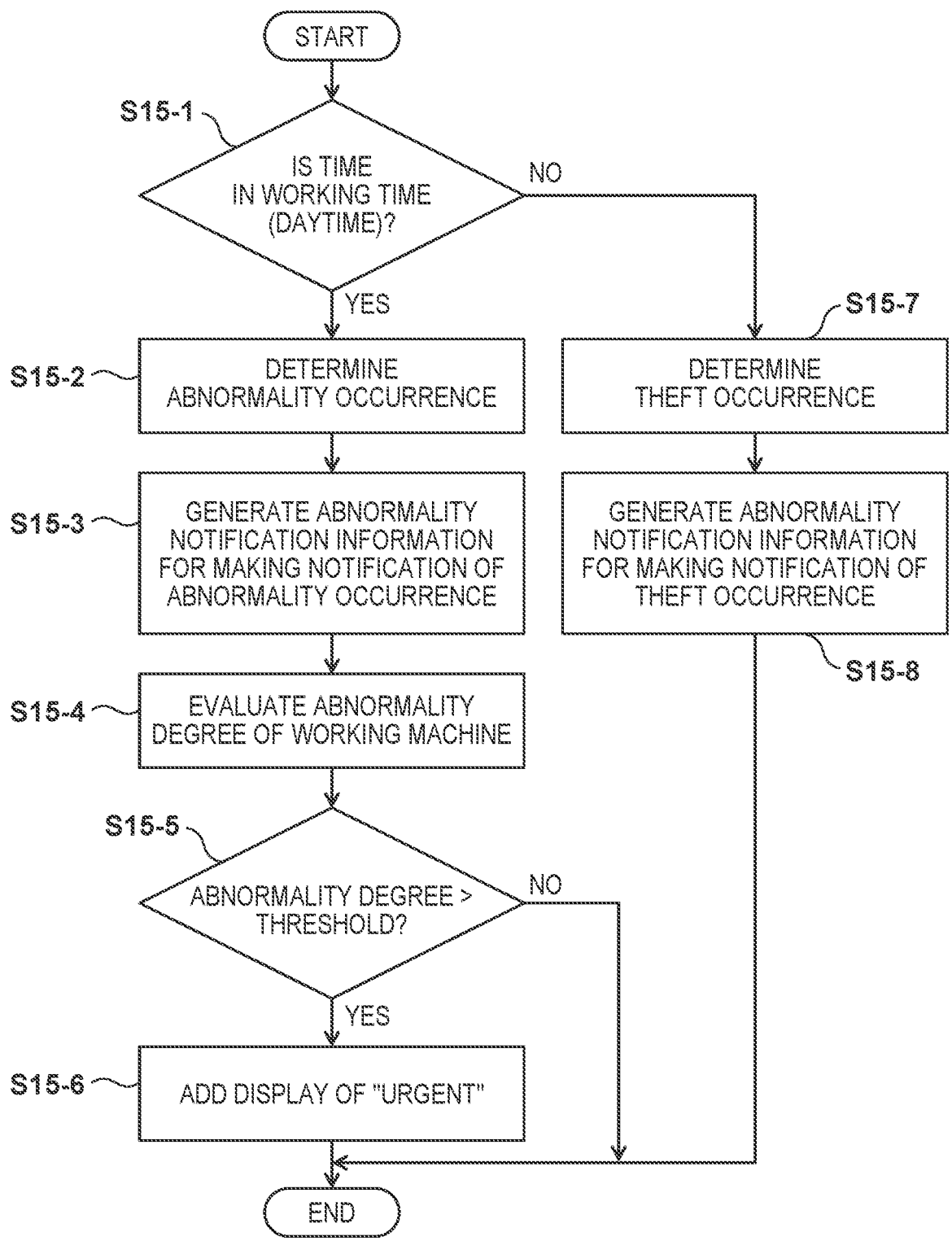
FIG. 7 is a flowchart illustrating an example of abnormality notification information generation processing.

Referring back to the flowchart shown in FIG. 5, in step S15, the processing unit 21 (generation unit 21*b*) generates the abnormality notification information for making a notification of the abnormality of the working machine 10. A practical example of the abnormality notification information generation processing performed in step S15 will be described with reference to FIG. 7. FIG. 7 is a flowchart illustrating an example of the abnormality notification information generation processing. Each step of the flowchart shown in FIG. 7 can be performed by the generation unit 21*b* of the processing unit 21 of the server apparatus 20.

In step S15-1, the generation unit 21*b* determines whether the reception time (time period) of the abnormality detection information is in a working time (for example, daytime). If, for example, the reception time of the abnormality detection information is in the working time, an abnormality (including performance deterioration) highly probably occurs in the working machine 10. Thus, the process advances to step S15-2, and the generation unit 21*b* determines that the abnormality has occurred in the working machine 10 (abnormality occurrence).

Figure 8:
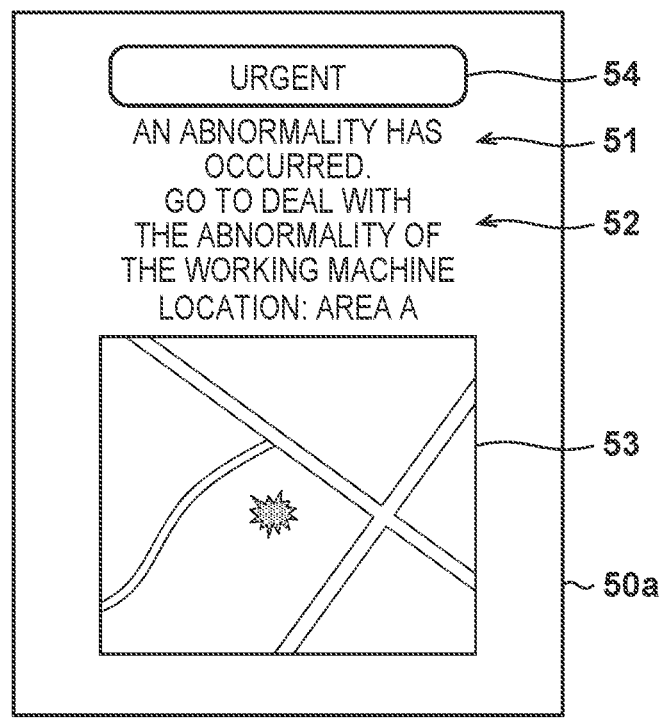
FIG. 8 is a view showing an example of display of abnormality notification information for making a notification of abnormality occurrence.

In step S15-3, the generation unit 21*b* generates the abnormality notification information for making a notification of the abnormality occurrence. FIG. 8 is a view showing an example of display of abnormality notification information 50*a* for making a notification of the abnormality occurrence, and the information is displayed on the display of the target terminal selected in step S14. The display example shown in FIG. 8 includes display 51 of "an abnormality has occurred" as information concerning the abnormality (the problem) of the working machine 10, and includes display 52 of "go to deal with the abnormality of the working machine 10" as information for encouraging a person to go to deal with the abnormality of the working machine 10. The display example shown in FIG. 8 also includes map information 53 indicating the position of the working machine 10 in which the abnormality has been detected.

In step S15-4, the generation unit 21*b* evaluates the abnormality degree of the working machine 10 based on the value (vibration, acceleration, or the like) detected by the abnormality detection unit 13 of the working machine 10. If, for example, the vibration sensor is provided as the abnormality detection unit 13 in the working machine 10, the generation unit 21*b* receives the information of the vibration detected by the vibration sensor together with the abnormality detection information, and evaluates the abnormality degree of the working machine 10 in accordance with the magnitude of the vibration. In this embodiment, the magnitude of the vibration detected by the vibration sensor is used as the abnormality degree of the working machine 10. However, for example, an index obtained by reflecting the detection result of another sensor (the acceleration sensor or the like) in addition to the detection result of the vibration sensor may be used as the abnormality degree.

In step S15-5, the generation unit 21*b* determines whether the abnormality degree evaluated in step S15-4 is larger than a threshold. If, for example, the abnormality degree (the vibration detected by the vibration sensor) is larger than the threshold, the abnormality of the working machine 10 highly probably needs to urgently be dealt with. Therefore, in this case, the process advances to step S15-6, and the generation unit 21*b* changes the notification contents of the abnormality notification information in accordance with the abnormality degree. In this embodiment, if the abnormality degree evaluated in step S15-4 is larger than the threshold, display 54 of "urgent" is added, as in the display example shown in FIG. 8. The threshold of the abnormality degree is set to a value larger than a predetermined value used to detect the abnormality of the working machine 10 by the abnormality detection unit 13.

The processing unit 21 (selection unit 21*a*) may change, in accordance with the abnormality degree of the working machine 10, the target terminal to which the abnormality notification information is to be transmitted. For example, if the abnormality degree of the working machine 10 is equal to or smaller than the threshold, the processing unit 21 selects, as the target terminal, only the information terminal 40 selected in step S14. On the other hand, if the abnormality degree of the working machine 10 is larger than the threshold, the abnormality needs to urgently be dealt with, and thus the information terminal 40 of the manager (for example, the owner) of the working area may also be added as the target terminal in addition to the information terminal 40 selected in step S14.

If, in step S15-1, the reception time (time period) of the abnormality detection information is outside the working time, the working machine 10 is normally in a stop state, and thus the probability that the abnormality has occurred in the working machine 10 is low and a theft (or unauthorized use outside the working time) of the working machine 10 highly probably occurs. Therefore, in this case, the process advances to step S15-7, and the generation unit 21*b* determines theft occurrence. As described above, since the working machine 10 is in the stop state outside the working time, the predetermined value used by the abnormality detection unit 13 to detect the abnormality of the working machine 10 may be set, outside the working time, to a value smaller than that during the working time.

The processing unit 21 (selection unit 21*a*) may change, in accordance with the reception time (time period) of the abnormality detection information, the target terminal to which the abnormality notification information is to be transmitted. If, for example, the reception time of the abnormality detection information is in the working time (for example, daytime), the processing unit 21 selects, as the target terminal, only the information terminal 40 selected in step S14. On the other hand, if the reception time of the abnormality detection information is outside the working time (for example, midnight), no leader highly probably exists within the working area, and thus the information terminal 40 of the manager (for example, owner) of the working area is set as the target terminal instead of the information terminal 40 selected in step S14.

Figure 9:
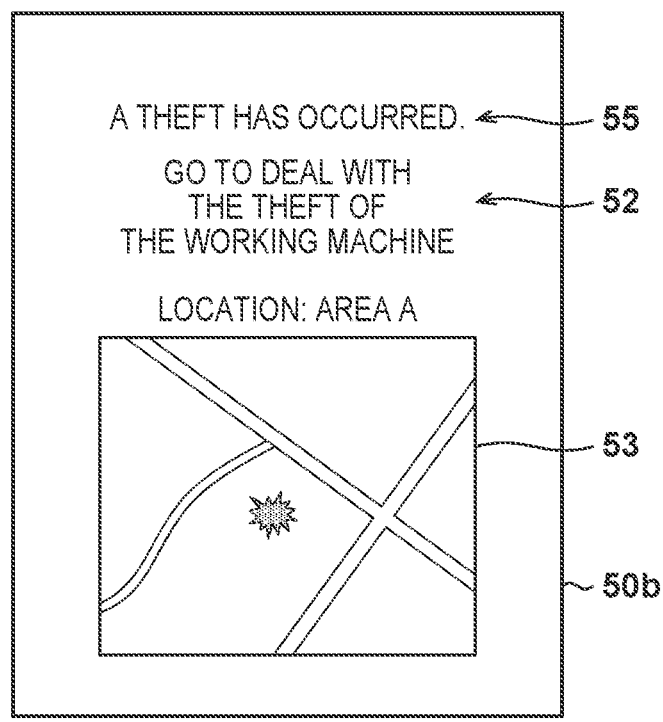
FIG. 9 is a view showing an example of display of abnormality notification information for making a notification of theft occurrence.

In step S15-8, the generation unit 21*b* generates the abnormality notification information for making a notification of theft occurrence. FIG. 9 is a view showing an example of display of abnormality notification information 50*b* for making a notification of theft occurrence, and the information is displayed on the display of the selected target terminal in step S16 (to be described later). The display example shown in FIG. 9 includes display 55 of "a theft has occurred" as information concerning the abnormality of the working machine 10, and includes the display 52 of "go to deal with the theft of the working machine" as information for encouraging the leader to go to deal with the theft of the working machine 10. The display example shown in FIG. 9 also includes the map information 53 indicating the position of the working machine 10 at the time of the occurrence of the theft.

Referring back to the flowchart shown in FIG. 5, in step S16, the processing unit 21 uses the communication unit 23 to transmit, via the network 30, the abnormality notification information generated in step S15 to the information terminal 40 (target terminal) selected in step S14.

This embodiment has explained the example in which the abnormality notification information is transmitted to the information terminal 40 selected as the target terminal. However, for example, information (second abnormality notification information) including notification contents different from the abnormality notification information may be transmitted to the information terminal 40 (to also be referred to as a "terminal other than the target" hereinafter) different from the target terminal. In the example shown in FIG. 2, the second abnormality notification information can be transmitted to each of the information terminals 40b and 40c (terminals other than the target) different from the information terminal 40a selected as the target terminal. The second abnormality notification information may be transmitted to the information terminal 40 of the manager (for example, owner) of the working area.

Figure 10:
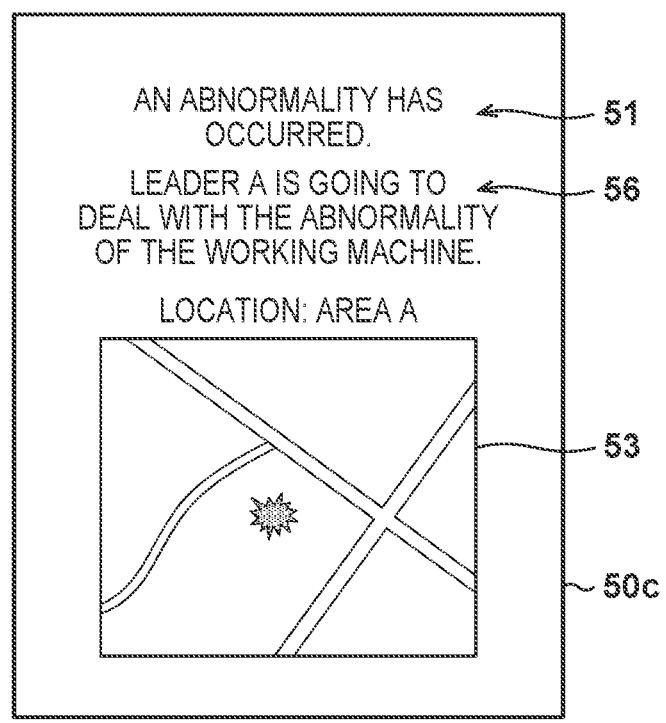
FIG. 10 is a view showing an example of display of second abnormality notification information.

FIG. 10 is a view showing an example of display of second abnormality notification information 50c, which is displayed on the display of the terminal other than the target. The second abnormality notification information 50c shown in FIG. 10 includes the display 51 of "an abnormality has occurred" as information concerning the abnormality of the working machine 10 and the map information 53 indicating the position of the working machine 10 in which the abnormality has been detected. To prevent the leader having the terminal other than the target from go to deal with the abnormality of the working machine 10, the second abnormality notification information 50c does not include information for encouraging the leader to go to deal with the abnormality of the working machine 10 but can include display 56 of "leader A is going to deal with the abnormality of the working machine" as information indicating the status of dealing with the abnormality of the working machine 10.

As described above, in this embodiment, among the plurality of information terminals 40, the information terminal 40 existing within the predetermined range R from the working machine 10a in which the abnormality has occurred is selected, and the abnormality notification information is transmitted to the selected information terminal 40. This can prevent a situation that a plurality of leaders go to deal with the abnormality of the working machine 10 in which the abnormality has been detected, thereby efficiently dealing with the abnormality of the working machine 10.

Second Embodiment

The second embodiment of the present invention will be described. The second embodiment basically takes over the first embodiment. However, while the processing unit 21 (selection unit 21a and the generation unit 21b) of the server apparatus 20 perform the target terminal selection processing and the abnormality notification information generation processing in the first embodiment, a control unit 11 of a working machine 10 performs these processes in the second embodiment.

FIG. 11 is a block diagram showing the arrangement of a system 200 according to this embodiment. The system 200 according to this embodiment includes the working machine 10 and a plurality of information terminals (information terminals 40a to 40d in FIG. 11). The control unit 11 of the working machine 10 includes a selection unit 11a that selects a target terminal and a generation unit 11b that generates abnormality notification information. Processes performed by the selection unit 11a and the generation unit 11b of the working machine 10 are the same as those performed by the selection unit 21a and the generation unit 21b of the server apparatus 20 described in the first embodiment. Furthermore, the control unit 11 of the working machine 10 according to this embodiment performs the same processing as that of the processing unit 21 of the server apparatus, which has been described with reference to the flowchart of FIG. 5 in the first embodiment.

That is, in this embodiment, the control unit 11 of the working machine 10 selects, among the plurality of information terminals 40, the information terminal 40 existing within a predetermined range R from a working machine 10a in which an abnormality has occurred, and transmits abnormality notification information to the selected information terminal 40 via a network 30. This can prevent a situation in which a plurality of leaders go to deal with the abnormality of the working machine 10 in which the abnormality has been detected, thereby efficiently dealing with the abnormality of the working machine 10.

Summary of Embodiments

A server apparatus of the above-described embodiment is a server apparatus (for example, 20) communicably connected to a vehicle (for example, 10) and a plurality of information terminals (for example, 40), comprising a reception unit (for example, 23) configured to receive abnormality detection information from the vehicle, a selection unit (for example, 21a) configured to select, if the reception unit receives the abnormality detection information, among the plurality of information terminals, the information terminal existing within a predetermined range from the vehicle as a target terminal to which abnormality notification information of the vehicle is to be transmitted, and a transmission unit (for example, 23) configured to transmit the abnormality notification information to the information terminal selected by the selection unit. According to this aspect, since a leader (or manager or the like) near the vehicle can be notified of an abnormality (a problem) of the vehicle, he/she can immediately grasp the status of the vehicle and quickly perform status confirmation. In addition, it is possible to prevent a plurality of leaders from go to deal with the abnormality (the problem) the vehicle in which the abnormality has been detected, thereby efficiently dealing with the abnormality of the vehicle.

If at least two information terminals exist within the predetermined range, the selection unit selects, from the at least two information terminals, the information terminal closest to the vehicle as the target terminal. According to this aspect, even if there are a plurality of leaders within the predetermined range, the leader closest to the vehicle can be notified of the abnormality notification information, and it is thus possible to quickly and efficiently deal with the abnormality of the vehicle.

If at least two information terminals exist within the predetermined range, the selection unit selects, from the at least two information terminals, the information terminal, whose preset priority level is high, as the target terminal. According to this aspect, even if there are a plurality of leaders within the predetermined range, the leader can be notified of the abnormality notification information in accordance with the preset priority level, and it is thus possible to quickly and efficiently deal with the abnormality of the vehicle.

The abnormality notification information includes information concerning an abnormality of the vehicle and position information of the vehicle. According to this aspect, it is possible to specify the status and position of the vehicle in which the abnormality has been detected and to notify the leader of more appropriate abnormality notification information.

The abnormality notification information includes information for encouraging a user to go to deal with an abnormality of the vehicle. According to this aspect, the leader (the user) can appropriately determine whether to go to deal with the abnormality of the vehicle.

The server apparatus further comprises an acquisition unit (for example, 21, 23) configured to acquire the position information of the vehicle and position information of each of the plurality of information terminals, wherein the selection unit selects the information terminal as the target terminal based on the pieces of position information acquired by the acquisition unit. According to this aspect, it is possible to appropriately select the information terminal which is to be notified of the abnormality notification information.

The transmission unit transmits second abnormality notification information including contents different from the abnormality notification information to, among the plurality of information terminals, the information terminal different from the information terminal selected as the target terminal. According to this aspect, a leader holding an information terminal other than the target terminal can also be notified of the abnormality of the vehicle.

The second abnormality notification information includes no information for encouraging a user to go to deal with the abnormality of the vehicle. According to this aspect, a leader (the user) holding an information terminal other than the target terminal can appropriately determine whether to go to deal with the abnormality of the vehicle.

The transmission unit transmits the abnormality notification information whose notification contents have been changed in accordance with an abnormality degree of the vehicle obtained from the abnormality detection information. According to this aspect, a leader notified of the abnormality notification information can immediately grasp the status of the vehicle, and quickly and appropriately deal with the abnormality of the vehicle.

The transmission unit transmits the abnormality notification information whose notification contents have been changed in accordance with a time period in which the reception unit receives the abnormality detection information. According to this aspect, a leader notified of the abnormality notification information can immediately grasp the status of the vehicle, and quickly and appropriately deal with the abnormality of the vehicle.

The selection unit changes the information terminal as the target terminal in accordance with the abnormality degree of the vehicle obtained from the abnormality detection information. According to this aspect, it is possible to appropriately deal with the abnormality of the vehicle in accordance with the abnormality degree of the vehicle.

The selection unit changes the information terminal as the target terminal in accordance with a time period in which the reception unit receives the abnormality detection information. According to this aspect, it is possible to appropriately deal with the abnormality of the vehicle in accordance with the time period in which the abnormality of the vehicle occurs.

Each of the plurality of information terminals is a portable information terminal. According to this aspect, since the abnormality notification information can be transmitted to an information terminal carried (held) by a leader, the leader can quickly know the abnormality of the vehicle and move while carrying the information terminal, and can thus appropriately deal with the abnormality of the vehicle even before arriving at the vehicle in which the abnormality has been detected.

A vehicle of the above-described embodiment is a vehicle (for example, 10) communicably connected to a plurality of information terminals (for example, 40), comprising a detection unit (for example, 13) configured to detect an abnormality of the vehicle, and a transmission unit (for example, 15) configured to transmit, if the detection unit detects the abnormality, abnormality notification information of the vehicle to, among the plurality of information terminals, the information terminal existing within a predetermined range from the vehicle. According to this aspect, since a leader (or a manager or the like) near the vehicle can be notified of the abnormality of the vehicle, he/she can immediately grasp the status of the vehicle and quickly perform status confirmation. In addition, it is possible to prevent a plurality of leaders from going to deal with the abnormality of the vehicle in which the abnormality has been detected, thereby efficiently dealing with the abnormality of the vehicle.

The present invention is not limited to the above embodiments and various changes and modifications can be made within the spirit and scope of the present invention. Therefore, to apprise the public of the scope of the present invention, the following claims are made.

What is claimed is:

1. A server apparatus that manages a plurality of vehicles, wherein each of the plurality of vehicles is configured to execute a work in a predetermined area, and leaders for dealing with abnormalities of the plurality of vehicles are arranged in the predetermined area, comprising:
a receiver configured to receive information from the plurality of vehicles, and a transmitter configured to transmit information to a plurality of information terminals respectively held by the leaders, wherein each of the plurality of vehicles includes an abnormality detector comprising a vibration sensor and an acceleration sensor, the abnormality detector being configured to detect a vehicle abnormality comprising a vibration above a predefined vibration threshold or an acceleration above a predefined acceleration threshold;
at least one processor circuit with a memory comprising instructions that, when executed by the processor circuit, cause the processor circuit to at least:
receive abnormality detection information indicating that the vehicle abnormality has been detected, from one of the plurality of vehicles via the receiver;
acquire first position information indicating a position of the vehicle from which the abnormality detection information is received, and second position information indicating positions of the plurality of information terminals;

set, in a case where the abnormality detection information is received, a range that is within a predetermined distance with reference to the vehicle from which the abnormality detection information is received, based on the first position information and the second position information, wherein the predetermined distance is determined based on intervals between the plurality of information terminals whose positions are indicated in the second position information;

select an information terminal existing within the range among the plurality of information terminals, as a target information terminal;

generate first abnormality notification information to be displayed on a display of the target information terminal for notifying of an occurrence of the vehicle abnormality of the vehicle; and transmit the first abnormality notification information to the target information terminal via the transmitter, wherein in a case where a time when the abnormality detection information has been received from the vehicle is outside a working time of the vehicle, the instructions further cause the processor circuit to select an information terminal of a manager managing the predetermined area instead of the target information terminal, generate second abnormality notification information to be displayed on a display of the information terminal of the manager for notifying of an occurrence of theft of the vehicle, and transmit the second abnormality notification information to the information terminal of the manager via the transmitter, and wherein each of the first abnormality notification information and the second abnormality notification information includes information for encouraging to go to deal with the vehicle abnormality of the vehicle, and map information indicating the position of the vehicle obtained from the first position information.

2. The server apparatus according to claim 1, wherein in a case where at least two information terminals exist within the range, the instructions further cause the processor circuit to select, from the at least two information terminals, an information terminal closest to the vehicle as the target information terminal.

3. The server apparatus according to claim 1, wherein in a case where at least two information terminals exist within the range, the instructions further cause the processor circuit to select, from the at least two information terminals, an information terminal whose preset priority level is higher than the other of the at least two information terminals as the target information terminal.

4. The server apparatus according to claim 1, wherein the instructions further cause the processor circuit to transmit the first abnormality notification information only to the target information terminal, and not to transmit the first abnormality notification information to an information terminal different from the target information terminal among the plurality of information terminals.

5. The server apparatus according to claim 1, wherein the instructions further cause the processor circuit to transmit the first abnormality notification information whose notification contents have been changed in accordance with an abnormality degree of the vehicle obtained from the abnormality detection information.

6. The server apparatus according to claim 1, wherein the instructions further cause the processor circuit to change the target information terminal in accordance with an abnormality degree of the vehicle obtained from the abnormality detection information.

7. The server apparatus according to claim 1, wherein each of the plurality of information terminals is a portable information terminal.

8. The server apparatus according to claim 1, wherein
the abnormality detection information includes information indicating magnitude of the vibration above the predefined vibration threshold detected in the vehicle, and
the instructions further cause the processor circuit to generate the first abnormality notification information such that notification contents of the first abnormality notification information is changed in accordance with the magnitude of the vibration detected in the vehicle.

9. The server apparatus according to claim 1, wherein the instructions further cause the processor circuit to determine an average value, a minimum value or a maximum value of the intervals between the plurality of information terminals, as the predetermined distance.

10. A vehicle working in a predetermined area, comprising:
a transmitter configured to transmit information to a plurality of information terminals respectively held by leaders that are arranged in the predetermined area for dealing with an abnormality of the vehicle;
an abnormality detector configured to detect the abnormality of the vehicle, the abnormality detector including a vibration sensor and an acceleration sensor, the abnormality detector being configured to detect a vibration above a predefined vibration threshold or an acceleration above a predefined acceleration threshold;
a sensor configured to detect a current position of the vehicle; and
at least one processor circuit with a memory comprising instructions that, when executed by the at least one processor circuit, cause the at least one processor circuit to at least:
acquire position information indicating positions of the plurality of information terminals;
set, in a case where the abnormality detector detects the abnormality of the vehicle, a range that is within a predetermined distance with reference to the vehicle, based on the current position of the vehicle detected by the sensor and the position information, wherein the predetermined distance is determined based on intervals between the plurality of information terminals whose positions are indicated in the position information;
select an information terminal existing within the range among the plurality of information terminals, as a target information terminal;
generate first abnormality notification information to be displayed on a display of the target information terminal for notifying of an occurrence of the abnormality of the vehicle; and
transmit the first abnormality notification information to the target information terminal via the transmitter,
wherein in a case where a time when abnormality detection information has been received indicating that the abnormality detector has detected the abnormality of the vehicle is outside a working time of the vehicle, the instructions further cause the at least one processor circuit to select an information terminal of a manager managing the predetermined area instead of the target information terminal, generate second abnormality notification information to be displayed on a display of the information terminal of the manager for notifying of an occurrence of theft of the vehicle, and transmit the second abnormality notification information to the information terminal of the manager via the transmitter, and wherein each of the first abnormality notification information and the second abnormality notification information includes information for encouraging to go to deal with the abnormality of the vehicle, and map information indicating the current position of the vehicle detected by the sensor.

11. A control method of a server apparatus that manages a plurality of vehicles, wherein each of the plurality of vehicles is configured to execute a work in a predetermined area, leaders for dealing with abnormalities of the plurality of vehicles are arranged in the predetermined area, and the server apparatus is communicably connected to the plurality of vehicles and a plurality of information terminals respectively held by the leaders, the method comprising:

receiving abnormality detection information indicating that an occurrence of a vehicle abnormality has been detected, from one of the plurality of vehicles, the one of the plurality of vehicles including a vibration sensor and an acceleration sensor, the vehicle abnormality comprising a detection of a vibration above a predefined vibration threshold or an acceleration above a predefined acceleration threshold;

acquiring first position information indicating a position of the vehicle from which the abnormality detection information is received, and second position information indicating positions of the plurality of information terminals;

set, when the abnormality detection information is received in the receiving, a range that is within a predetermined distance with reference to the vehicle from which the abnormality detection information is received based on the first position information and the second position information, wherein the predetermined distance is determined based on intervals between the plurality of information terminals whose positions are indicated in the second position information;

select an information terminal existing within the range among the plurality of information terminals, as a target information terminal;

generating first abnormality notification information to be displayed on a display of the target information terminal for notifying of the occurrence of the vehicle abnormality of the vehicle; and transmitting the first abnormality notification information to the target information terminal, wherein when a time when the abnormality detection information has been received from the vehicle is outside a working time of the vehicle, an information terminal of a manager managing the predetermined area is selected instead of the target information terminal, second abnormality notification information to be displayed on a display of the information terminal of the manager for notifying of an occurrence of theft of the vehicle is generated, and the second abnormality notification information is transmitted to the information terminal of the manager; and wherein each of the first abnormality notification information and the second abnormality notification information includes information for encouraging to go to deal with the vehicle abnormality of the vehicle, and map information indicating the position of the vehicle obtained from the first position information.

* * * * *